US007487732B2

(12) United States Patent
Johnston et al.

(10) Patent No.: US 7,487,732 B2
(45) Date of Patent: Feb. 10, 2009

(54) BOOT WITH SCRAPER FOR A FERTILIZER OPENER IN AN AGRICULTURAL MACHINE

(75) Inventors: Mark Johnston, Geneseo, IL (US); James Randall Peterson, Annawan, IL (US)

(73) Assignee: Deere & Company, Moline, IL (US)

( * ) Notice: Subject to any disclaimer, the term of this patent is extended or adjusted under 35 U.S.C. 154(b) by 240 days.

(21) Appl. No.: 11/483,921

(22) Filed: Jul. 10, 2006

(65) Prior Publication Data

US 2008/0006189 A1 Jan. 10, 2008

(51) Int. Cl.
*A01C 5/00* (2006.01)
*A01C 13/00* (2006.01)
*A01C 23/00* (2006.01)

(52) U.S. Cl. ....................... 111/121; 111/123; 111/156; 111/167; 111/194

(58) Field of Classification Search ......... 111/120–129, 111/149, 152–169, 190–194
See application file for complete search history.

(56) References Cited

U.S. PATENT DOCUMENTS 5,269,237 A 12/1993 Baker et al. ................. 111/121
2002/0134288 A1 9/2002 Baker et al. ................. 111/157

FOREIGN PATENT DOCUMENTS

DE 3418176 11/1985
FR 2727601 6/1996

*Primary Examiner*—Christopher J. Novosad
(74) *Attorney, Agent, or Firm*—Taylor & Aust, P.C.

(57) ABSTRACT

An agricultural machine includes a frame and at least one fertilizer opener carried by the frame for opening a trench in soil. Each fertilizer opener includes an opener disc positioned at an angle relative to a working direction, a boot positioned behind the opener disc relative to the working direction, and at least one fertilizer tube positioned behind the boot relative to the working direction. The boot includes a recess at a trailing edge thereof. The recess at least partially surrounds at least one fertilizer tube.

25 Claims, 6 Drawing Sheets

10 12 16 26 28 30 36 20 18 34 38 22 24 32
12 16 38 42 18 40 24A 44 48 20 22 50 24 46

BOOT WITH SCRAPER FOR A FERTILIZER OPENER IN AN AGRICULTURAL MACHINE

FIELD OF THE INVENTION

The present invention relates to agricultural machines, and, more particularly, to fertilizer openers for forming a trench in soil in which fertilizer is deposited.

BACKGROUND OF THE INVENTION

An agricultural seeding machine such as a row crop planter or grain drill places seeds at a desired depth within a plurality of parallel seed trenches formed in soil. In the case of a row crop planter, a plurality of row crop units are typically ground driven using wheels, shafts, sprockets, transfer cases, chains and the like. Each row crop unit has a frame which is moveably coupled with a tool bar.

In areas where air seeder type equipment is used to seed small grains there has been a significant move to reduce input costs to the seeding process. One way to do this is to adopt no-till farming practices to reduce equipment and fuel costs. Another way is to combine the operations involved in seeding, for example tillage, seed bed preparation, fertilizer and seed placement. A further option is to utilize combined operations in a no-till farming practice.

There are machines presently available that have some ability to combine these operations. These are usually divided into two categories, air hoe drills and air disc drills. The first utilizes a combination of shanks with shovels or boots to create a trench for the seed, basically it 'hoes' a trench. Examples of such tools are John Deere 1820, Bourgault 5710, Morris Maxim II, 8900 and 9000, or Case ATX Series. The second type utilizes disc type openers to create the seed trench. Examples of such tools are John Deere 1890, Bourgault 5720, Morris Never Pin or Case SDX Series.

Not all of these machines are capable of placing fertilizer at the same time as seeding. Generally it is easiest to place dry granular fertilizer at the same time as seeding since that type of fertilizer can be distributed by a similar air delivery system. The application of liquid fertilizer requires an additional delivery and distribution system, typically not supplied by the air seeder manufacturer. The application of gaseous fertilizer such as anhydrous ammonia (also referred to as NH3) also requires an additional delivery and distribution system, typically not supplied by the air seeder manufacturer. A further difficulty with NH3 is the requirement to effectively seal the gas into the ground. This is typically the most challenging task for these openers.

To effectively retain the gas in the ground it is necessary to place the gas accurately in a trench and seal it therein. To achieve this it is preferable to create a small, neat trench at constant depth and close the trench quickly and efficiently afterwards. The difficulties encountered with known designs are in all aspects of this operation. Those devices suffer from one or more of the following detrimental actions: 1) too much soil disturbance creating a large trench with soil displaced significantly; 2) lack of depth control; and 3) inability to close or seal the trench immediately after release of the gas.

It is known to use a fertilizer opener with a boot/scraper that is entirely within the profile of the opener disc and has no interference with the opposite trench sidewall to create a narrow trench. This configuration has experienced difficulties operating in adverse conditions since the boot/scraper is not pressed against the opener disc sufficiently to prevent soil, mud and/or residue from entering therebetween and causing the opener disc to quit turning and push the boot far out thus creating an excessive trench. Other known fertilizer openers use boots and scrapers that protrude significantly from the trench cut by the opener disc, but displace too much soil from the trench and make it difficult to close and seal the trench.

Other types of fertilizer openers allow use of the three main fertilizer types (dry granular, liquid and gaseous anhydrous ammonia). However, such openers require different types of attachments and mounting hardware changes to swap from one fertilizer type to another. This is labor intensive, with increased costs and chances of assembly error.

What is needed in the art is a fertilizer opener which quickly and easily allows for use with dry, liquid and/or gaseous fertilizers.

SUMMARY OF THE INVENTION

The invention comprises, in one form thereof, an agricultural machine, including a frame and at least one fertilizer opener carried by the frame for opening a trench in soil. Each fertilizer opener includes an opener disc positioned at an angle relative to a working direction, a boot positioned behind the opener disc relative to the working direction, and at least one fertilizer tube positioned behind the boot relative to the working direction. The boot includes a recess at a trailing edge thereof. The recess at least partially surrounds at least one fertilizer tube.

The invention comprises, in another form thereof, a fertilizer opener for opening a furrow in soil, including a boot having a trailing edge relative to a working direction, and a recess at the trailing edge. The recess is configured for at least partially surrounding at least one fertilizer tube.

DETAILED DESCRIPTION OF THE INVENTION

Figure 1:
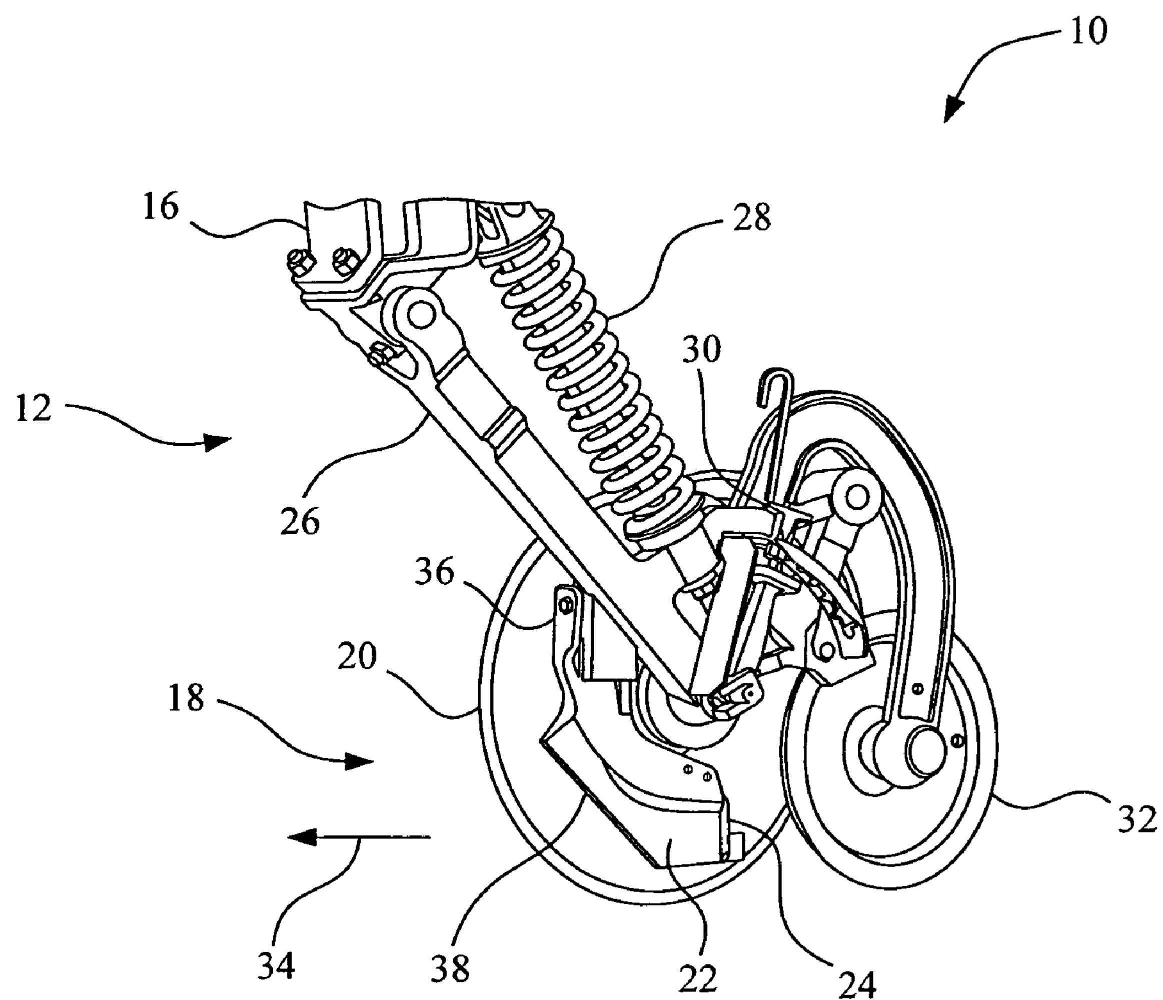
FIG. 1 is a perspective view of a fertilizer opener assembly, including an embodiment of a fertilizer opener of the present invention.
Figure 2:
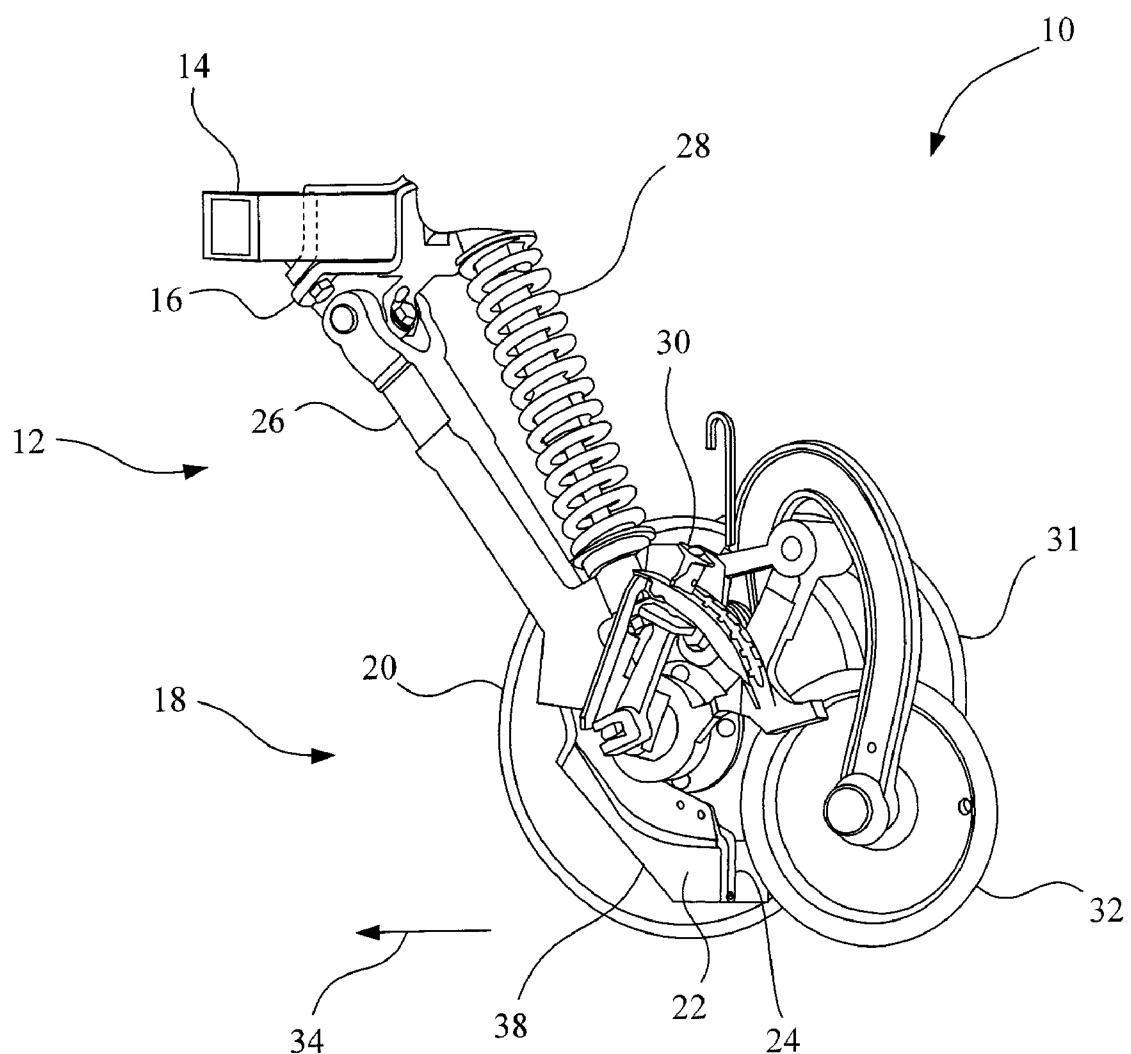
FIG. 2 is another perspective view of the fertilizer opener assembly shown in FIG. 1.

Referring now to the drawings, and more particularly to FIGS. 1 and 2, there is shown an embodiment of an agricultural machine of the present invention in the form of a seeder 10. In the embodiment shown, seeder 10 is in the form of an air seeder but may be differently configured.

Figure 3:
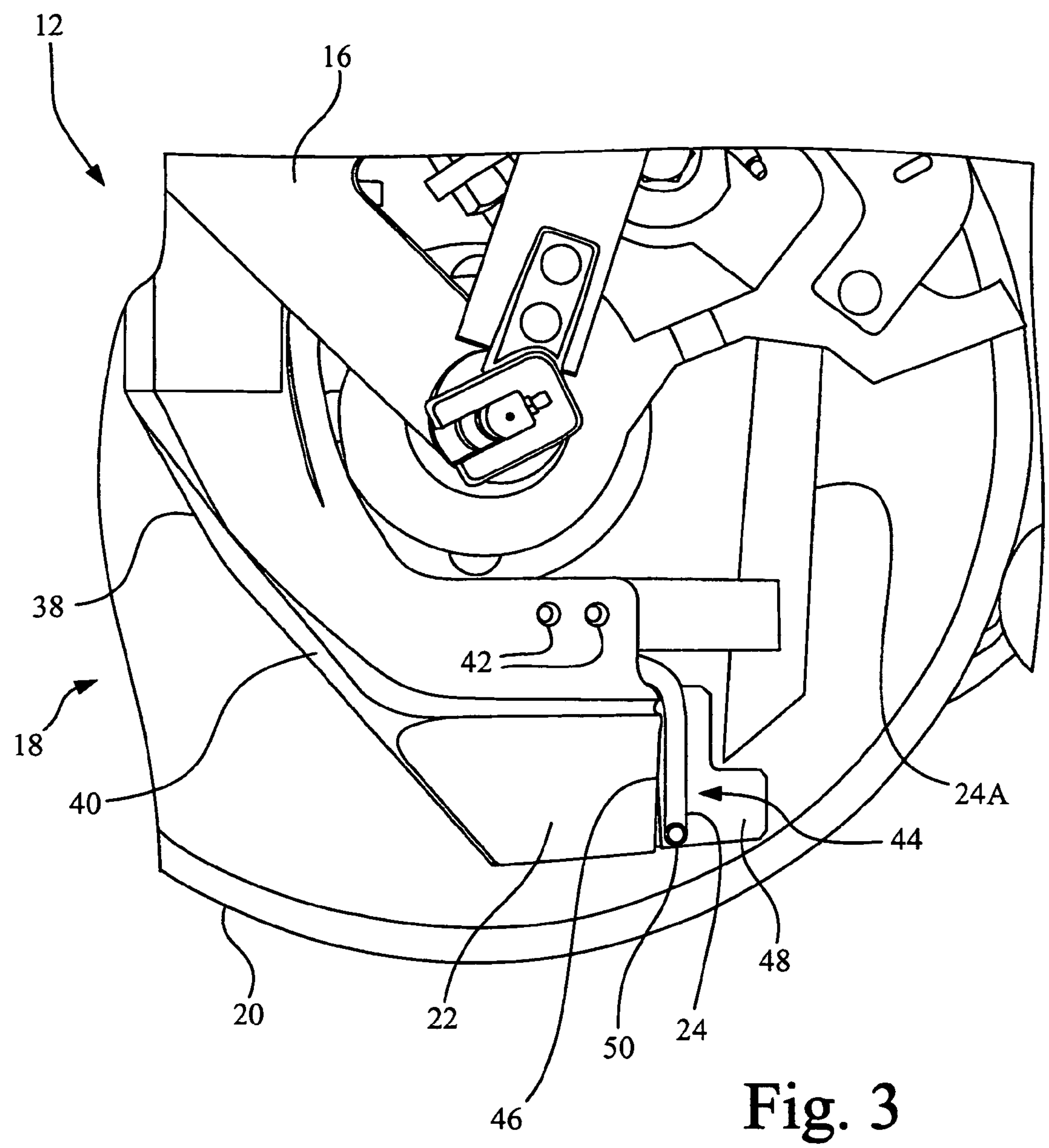
FIG. 3 is a fragmentary, side view of the fertilizer opener assembly of FIGS. 1 and 2.

Seeder 10 generally includes a plurality of fertilizer opener assemblies 12, with each fertilizer opener assembly 12 being substantially identical. Only a single fertilizer opener assembly 12 is shown in FIGS. 1-3 for simplicity sake. Each fertilizer opener assembly 12 is connected to a common tool bar 14, which in turn is coupled to a traction unit (not shown), such as an agricultural tractor. For example, tool bar 14 may be coupled to an agricultural tractor using a 3-point hitch assembly. Tool bar 14 may be coupled with transport wheel assemblies, etc. which may be of conventional design and not shown for simplicity sake. The transport wheels, in known manner, may provide ground drive to supply fertilizer at a selected rate to fertilizer opener assembly 12 through the use of shafts, chains, sprockets, transfer cases, etc.

Fertilizer opener assembly 12 includes a frame 16 carrying a fertilizer opener 18 for opening a trench in the soil in which one or more selected fertilizer types are deposited (e.g., dry, liquid and/or gaseous fertilizer). Fertilizer opener 18 is defined as including an opener disc 20, boot 22 and one or more fertilizer tubes 24. Frame 16 includes a linkage 26 which is biased in a downward direction with a compression coil spring 28. A quick-adjust depth adjuster 30 moves the vertical orientation of gauge wheel 31 relative to opener disc 20 to thereby adjust the cutting depth of opener disc 18 into the soil.

Opener disc 20 is preferably generally planar, but may also have a generally convex or concave shape relative to the working direction 34, depending upon the application. It will be appreciated that the side of boot 22 adjacent opener disc 20 can be modified accordingly for efficient scraping operation, as will be described below. Opener disc 20 is oriented at an angle of between 4 to 7 degrees relative to working direction 34, but may also be at a different orientation.

Boot 22 includes a mounting bracket 36 providing pivotal coupling with frame 16. Boot 22 is positioned behind opener disc 20 relative to working direction 34, and extends slightly past the frontal profile of opener disc 20 to slightly widen the trench formed in the soil by opener disc 20. In the embodiment shown, boot 22 has an interference with the offside trench wall of between approximately ⅛ to ½ inch, preferably approximately ¼ inch. This interference ensures that boot 22 is pressed against opener disc 20 for effective scraping operation, as will be described below, without moving too much soil from the trench.

More particularly, boot 22 includes a scraper 38 positioned near the leading edge of opener disc 20, adjacent the trench side of opener disc 20. Scraper 38 is at the leading edge of boot 22, and is downwardly angled relative to working direction 34. Scraper 38 has a contour closely matching with the trench side of opener disc 20 to effectively scrape mud, soil and other debris from the trench side of opener disc 20. Scraper 38 includes a rearwardly extending beveled edge 40 assisting in movement of the mud, soil, etc. away from the leading edge of scraper 38.

Boot 22 also includes a plurality of mounting features 42 allowing attachment with one or more selected fertilizer tubes 24, only one of which is shown in FIGS. 1-3. In the embodiment shown in FIGS. 1-3, mounting features 42 are in the form of a pair of mounting holes allowing attachment with one or more fertilizer tubes 24 for selective application of dry, liquid and/or gaseous fertilizer. Two mounting holes 42 are provided so that the fertilizer tube(s) cannot pivot or otherwise move when attached with boot 22. Other mounting features of a different number and configuration are possible for securing the fertilizer tube(s) to boot 22.

Boot 22 includes a recess 44 at the trailing edge thereof which at least partially surrounds one or more fertilizer tubes 24. This recess 44 protects at least one of the fertilizer tubes 24 from becoming dislodged or damaged during operation. More particularly, recess 44 has a generally L-shaped configuration surrounding at least one fertilizer tube 24 on a leading edge of the fertilizer tube 24 and an opener disc side of the fertilizer tube 24. The other side of the fertilizer tube adjacent the offside wall of the trench is preferably not covered by the recess so that the selected fertilizer(s) can be discharged into the trench and absorbed into the offside and bottom walls of the trench, minimizing evaporation into the atmosphere, particularly in the event of a gaseous fertilizer.

A rearward face 46 and rearwardly extending plate 48 define the generally L-shaped recess 44. Rearward face 46 has a width which is greater than the width of fertilizer tube(s) 24, and rearwardly extending plate 48 has a width less than the width of rearward face 46. Plate 48 is positioned between opener disc 20 and fertilizer tube(s) 24, acting as a thermal barrier therebetween. This is particularly important when fertilizer tube 24 is used to apply a gaseous fertilizer which evaporates at −28 degrees F. when exposed to atmospheric pressure. Plate 48 effectively prevents excessive cooling of opener disc 20, which can cause mud and soil to freeze to opener disc 20 and prevent effective operation of opener disc 20.

Fertilizer tube 24 includes a bottom discharge opening 50 which is optionally oriented at between 30 to 60 degrees from vertical. This beveled side discharge opening allows the fertilizer to discharge in a direction away from opener disc 20. The fertilizer tube 24 is thus directly exposed to the sidewall of the trench formed by boot 22. This is a particular benefit for the application of NH3 fertilizer since it needs to be rapidly absorbed by the soil to prevent 'out-gassing' (the loss of the gas to the atmosphere).

Figure 4:
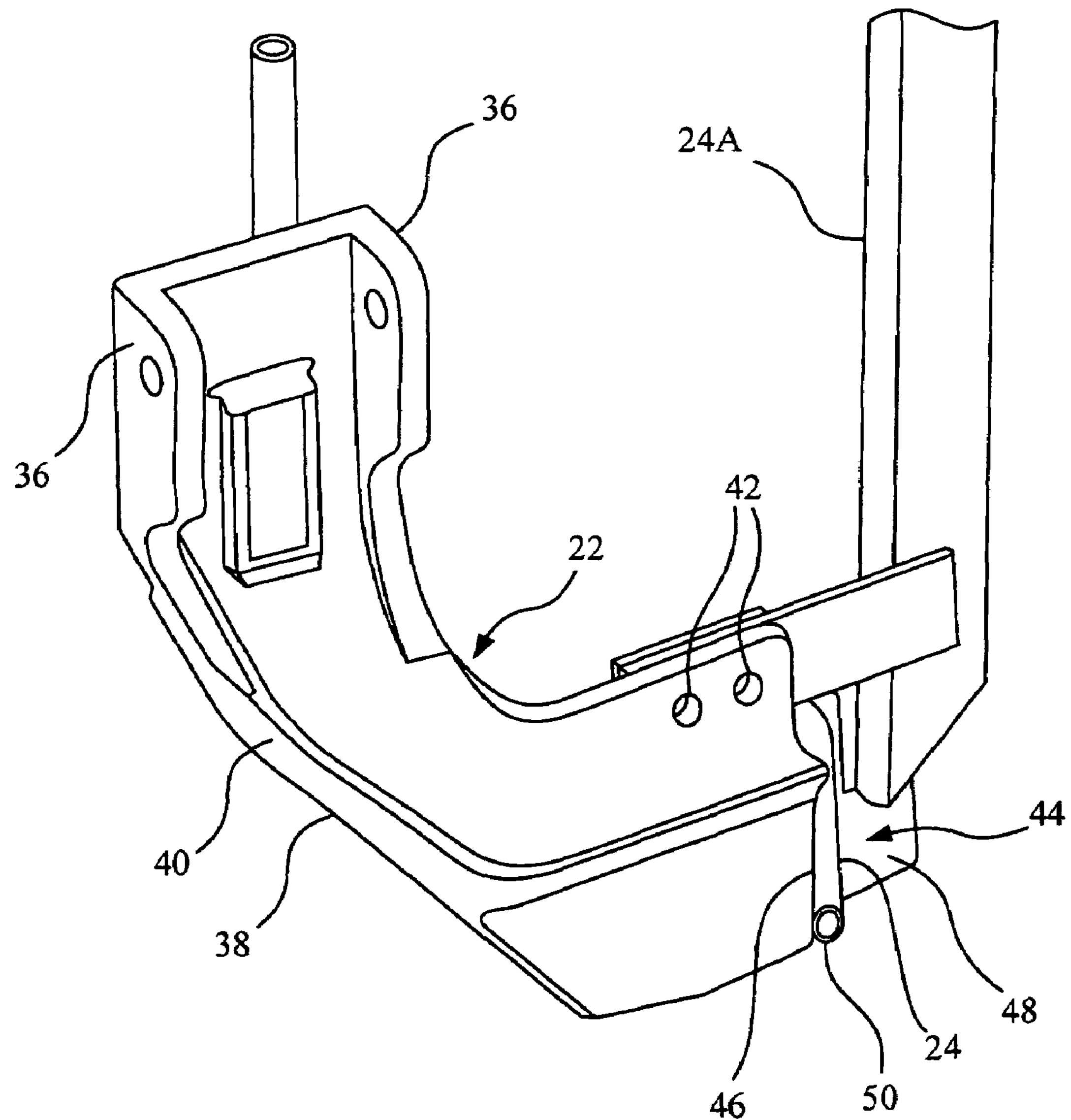
FIG. 4 is a perspective view of the boot/scraper forming part of the fertilizer opener of FIGS. 1-3.
Figure 5:
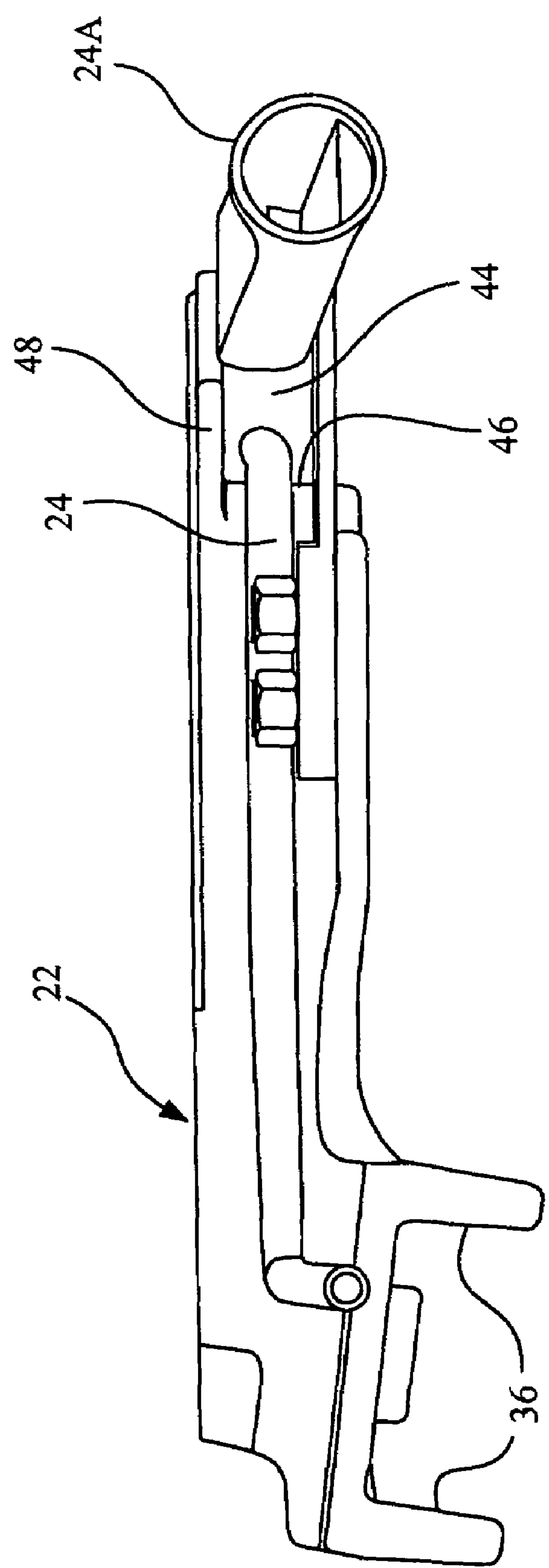
FIG. 5 is a top view of the fertilizer opener of FIG. 4.
Figure 6:
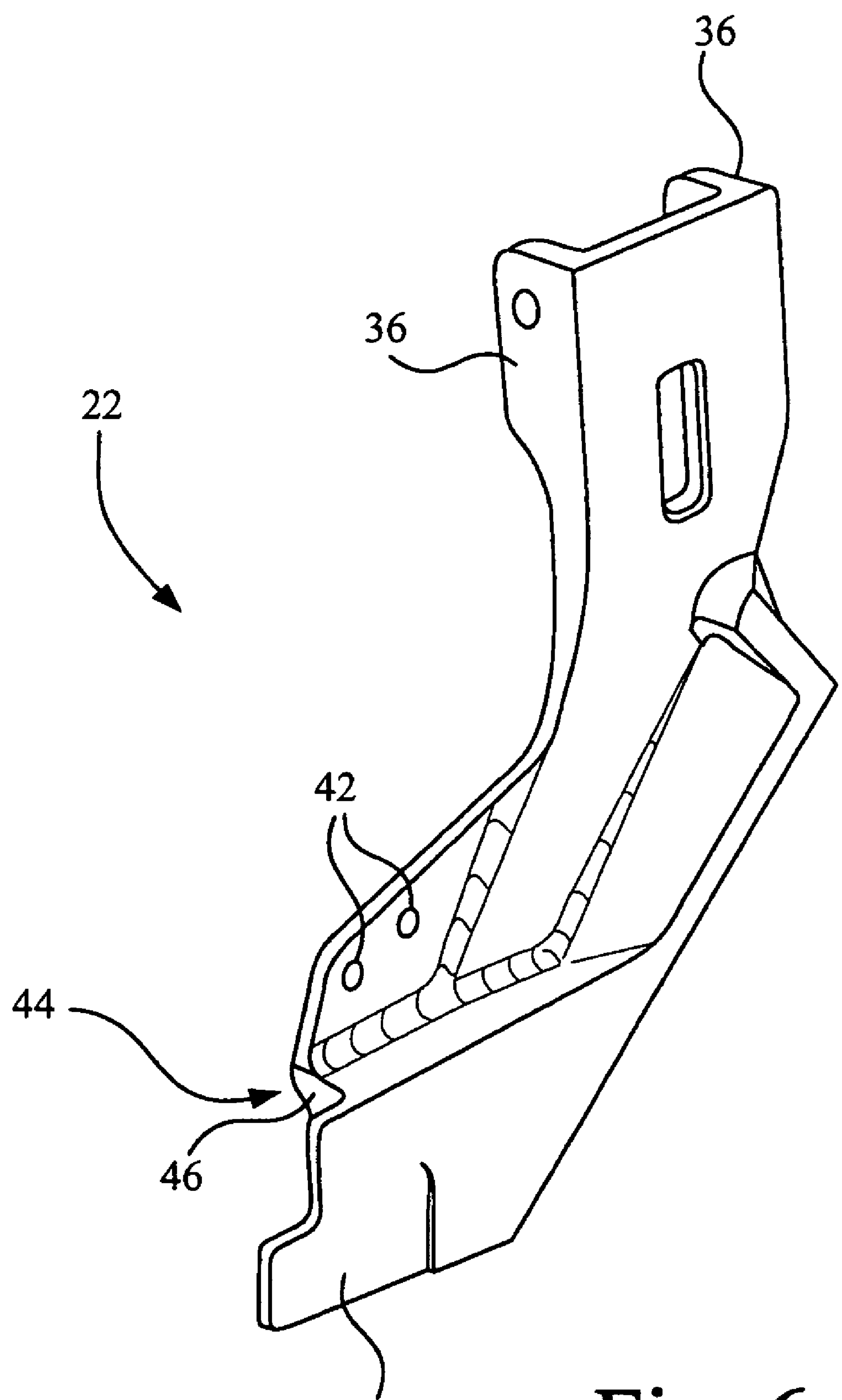
FIG. 6 is a perspective view of the fertilizer opener of FIGS. 4 and 5.

In FIGS. 1 and 2, only a single fertilizer tube 24 is shown attached to boot 22. The fertilizer tube shown could be a liquid fertilizer tube or gaseous fertilizer tube, the primary difference being the diameter of the tube. From the foregoing, it should also be apparent that the number and/or type of fertilizer tubes attached to boot 22 can vary. Moreoever, as shown in FIGS. 3-5, a fertilizer tube 24A can also be carried by frame 16 for depositing fertilizer into the trench prior to closing with closing wheel 32.

During operation, the cutting depth of opener disc 20 is manually set using depth adjuster 30. The air seeder 10 is raised at the ends of the field for turning around, and lowered for traveling across the field. When the air seeder is lowered, coil spring 28 biases opener disc 20 into the soil. Opener disc 20 forms a trench in the soil having a width corresponding to the projected frontal width of opener disc 20 at an angle to working direction 34. The trench is slightly widened using boot 22, and the lateral force exerted by the offside side wall against boot 22 biases boot 22 against the trench side of opener disc 20 for effective scraping operation. The one or more fertilizer tubes have a discharge end which is positioned behind boot 22 at least partially within recess 44. The fertilizer is deposited into the trench, which is then covered by closing wheel 32.

Having described the preferred embodiment, it will become apparent that various modifications can be made without departing from the scope of the invention as defined in the accompanying claims.

The invention claimed is:

1. An agricultural machine, comprising:

a frame; and at least one fertilizer opener carried by said frame for opening a trench in soil, each said fertilizer opener including an opener disc positioned at an angle relative to a working direction, a boot positioned behind said opener disc relative to said working direction, and at least one fertilizer tube positioned behind said boot relative to said working direction, said boot including a rearward face and a rearwardly extending plate between said at least one fertilizer tube and said opener disk, said rearward face and rearwardly extending plate defining a recess at a trailing edge of said boot, said recess at least partially surrounding the at least one fertilizer tube.

2. The agricultural machine of claim 1, wherein said rearward face has a width greater than said at least one fertilizer tube.

3. The agricultural machine of claim 2, wherein said rearwardly extending plate has a width less than said rearward face.

4. The agricultural machine of claim 3, wherein the at least one fertilizer tube includes a bottom discharge opening oriented at between 30 to 60 degrees from vertical.

5. The agricultural machine of claim 1, wherein said plate defines a thermal barrier between said opener disc and the at least one fertilizer tube.

6. The agricultural machine of claim 1, wherein said recess has a generally L-shaped configuration partially surrounding the at least one fertilizer tube on two sides thereof.

7. The agricultural machine of claim 6, wherein said recess partially surrounds said at least one said fertilizer tube on a leading edge and an opener disc side of said at least one fertilizer tube.

8. The agricultural machine of claim 1, wherein said boot includes a plurality of mounting features for mounting said at least one fertilizer tube to said boot.

9. The agricultural machine of claim 8, wherein said mounting features include a pair of mounting holes.

10. The agricultural machine of claim 1, wherein said boot widens a trench formed in the soil by the opener disc sufficiently to press said boot against said opener disc.

11. The agricultural machine of claim 10, wherein said boot is pivotally coupled with said frame.

12. The agricultural machine of claim 11, wherein said boot is configured to be pressed against said opener disc by a sidewall of the trench.

13. The agricultural machine of claim 1, wherein said boot includes a scraper positioned adjacent a trench side of said opener disc.

14. The agricultural machine of claim 13, wherein said scraper includes a leading edge which is downwardly angled relative to said working direction.

15. The agricultural machine of claim 14, wherein said scraper includes a beveled edge extending rearwardly away from said leading edge.

16. A fertilizer opener for opening a furrow in soil, comprising an opener disc positioned at an angle relative to a working direction, a boot positioned behind said opener disc relative to said working direction, and at least one fertilizer tube positioned behind said boot relative to said working direction, said boot including a rearward face and a rearwardly extending plate between said at least one fertilizer tube and said opener disk, said rearward face and rearwardly extending plate defining a recess at a trailing edge of said boot, said recess at least partially surrounding the at least one fertilizer tube.

17. The fertilizer opener of claim 16, wherein said rearward face has a width greater than said at least one fertilizer tube.

18. The fertilizer opener of claim 17, wherein said rearwardly extending plate has a width less than said rearward face.

19. The fertilizer opener of claim 18, wherein the at least one fertilizer tube includes a bottom discharge opening oriented at between 30 to 60 degrees from vertical.

20. The agricultural machine of claim 16, wherein said plate defines a thermal barrier between said opener disc and the at least one fertilizer tube.

21. The fertilizer opener of claim 16, wherein said recess has a generally L-shaped configuration partially surrounding the at least one fertilizer tube on two sides thereof.

22. The fertilizer opener of claim 21, wherein said recess partially surrounds said at least one said fertilizer tube on a leading edge and an opener disc side of said at least one fertilizer tube.

23. A fertilizer opener for opening a furrow in soil, said fertilizer opener comprising a boot positionable adjacent an opening disc and having a trailing edge relative to a working direction including a rearward face and a rearwardly extending plate, said rearward face and rearwardly extending plate defining a recess configured for at least partially surrounding at least one fertilizer tube, said rearwardly extending plate being positioned between the fertilizer tube and the opening disc.

24. The agricultural machine of claim 23, wherein said plate defines a thermal barrier.

25. The fertilizer opener of claim 23, wherein said recess has a generally L-shaped configuration.

* * * * *